United States Patent
Machida

(10) Patent No.: US 12,263,586 B2
(45) Date of Patent: Apr. 1, 2025

(54) CONTROL SYSTEM, CONTROL APPARATUS, CONTROL METHOD, AND RECORDING MEDIUM

(71) Applicant: NEC Corporation, Tokyo (JP)

(72) Inventor: Manao Machida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 264 days.

(21) Appl. No.: 17/798,123

(22) PCT Filed: Feb. 27, 2020

(86) PCT No.: PCT/JP2020/007942
§ 371 (c)(1),
(2) Date: Aug. 8, 2022

(87) PCT Pub. No.: WO2021/171461
PCT Pub. Date: Sep. 2, 2021

(65) Prior Publication Data
US 2023/0076609 A1 Mar. 9, 2023

(51) Int. Cl.
*B25J 9/00* (2006.01)

(52) U.S. Cl.
CPC ... *B25J 9/0084* (2013.01); *G05B 2219/39001* (2013.01)

(58) Field of Classification Search
CPC .................. B25J 9/0084; B25J 9/1682; G05B 2219/39001; G05D 1/02
See application file for complete search history.

(56) References Cited

U.S. PATENT DOCUMENTS

| | | | |
|---|---|---|---|
| 9,419,854 B1* | 8/2016 | Wang | H04L 41/042 |
| 11,352,071 B1* | 6/2022 | Ebrahimi Afrouzi | G05D 1/0217 |
| 2010/0152899 A1* | 6/2010 | Chang | B25J 9/1682 700/262 |
| 2013/0184864 A1* | 7/2013 | Guo | G05D 1/0274 700/248 |
| 2019/0381654 A1* | 12/2019 | Oleynik | A47J 36/321 |

FOREIGN PATENT DOCUMENTS

JP 2006-338081 A 12/2006

OTHER PUBLICATIONS

International Search Report for PCT Application No. PCT/JP2020/007942, mailed on May 12, 2020.
(Continued)

*Primary Examiner* — Khoi H Tran
*Assistant Examiner* — Tien Minh Le

(57) ABSTRACT

A control system includes a control apparatus and a plurality of robots. The control apparatus includes a function acquisition unit that acquires a function, a function form conversion unit that converts the function into a distributed calculable form, and a variable conversion unit that sets, based on the function which form is converted, variables to be stored by each of the robots and a process corresponding to the variables, to the robot. Each of the plurality of robots a consensus control means that updates a variable value stored by the robot itself based on the set variable while sending and receiving variable values among other communicable robots, and a function value inference means that infers a function value from the variable based on the set process.

6 Claims, 12 Drawing Sheets

(56) References Cited

OTHER PUBLICATIONS

Sakurama Kazunori, "Design theory of Distributed Controllers over Networks", Journal of The Society of Instrument and Control Engineers, vol. 55, No. 11, Nov. 2016, pp. 972-977.
Ishii Hideaki, "Control of Multi-Agent Systems—I General Theory", May 15, 2013, vol. 57, No. 5, pp. 29-36
Spanos, Demetri P. et al., "Dynamic consensus for mobile networks", The 16th IFAC World Congress, 2005, pp. 1-6.
Sakurama Kazunori, "Control of Multi-Agent Systems—III Agreed Control(1)", vol. 57, No. 9, Sep. 15, 2013.
Segawa Kohei, "Distributed Change-Point Detection by Average Consensus Dynamics", Proceedings of the 58th Annual Conference of the Institute of Systems, Control and Information Engineers, May 2014, pp. 1-5.
JP Office Action for JP Application No. 2022-502697, mailed on Sep. 19, 2023 with English Translation.
Kiyotaka Yamamura et al., Algorithm I, "An Algorithm for Representation of Nonseparable Functions in Separable Forms", IEICE Technical Report, Japan, The Institute of Electronics, Information and Communication Engineers, Mar. 15, 1994, vol. 93, No. 510, pp. 67-74.
Kiyotaka Yamamura et al., Algorithm II, "An Algorithm for Representation of Nonseparable Functions in Separable Forms", IEICE Technical Report, Japan, The Institute of Electronics, Information and Communication Engineers, Mar. 15, 1994, vol. 93, No. 510, pp. 75-82.

* cited by examiner

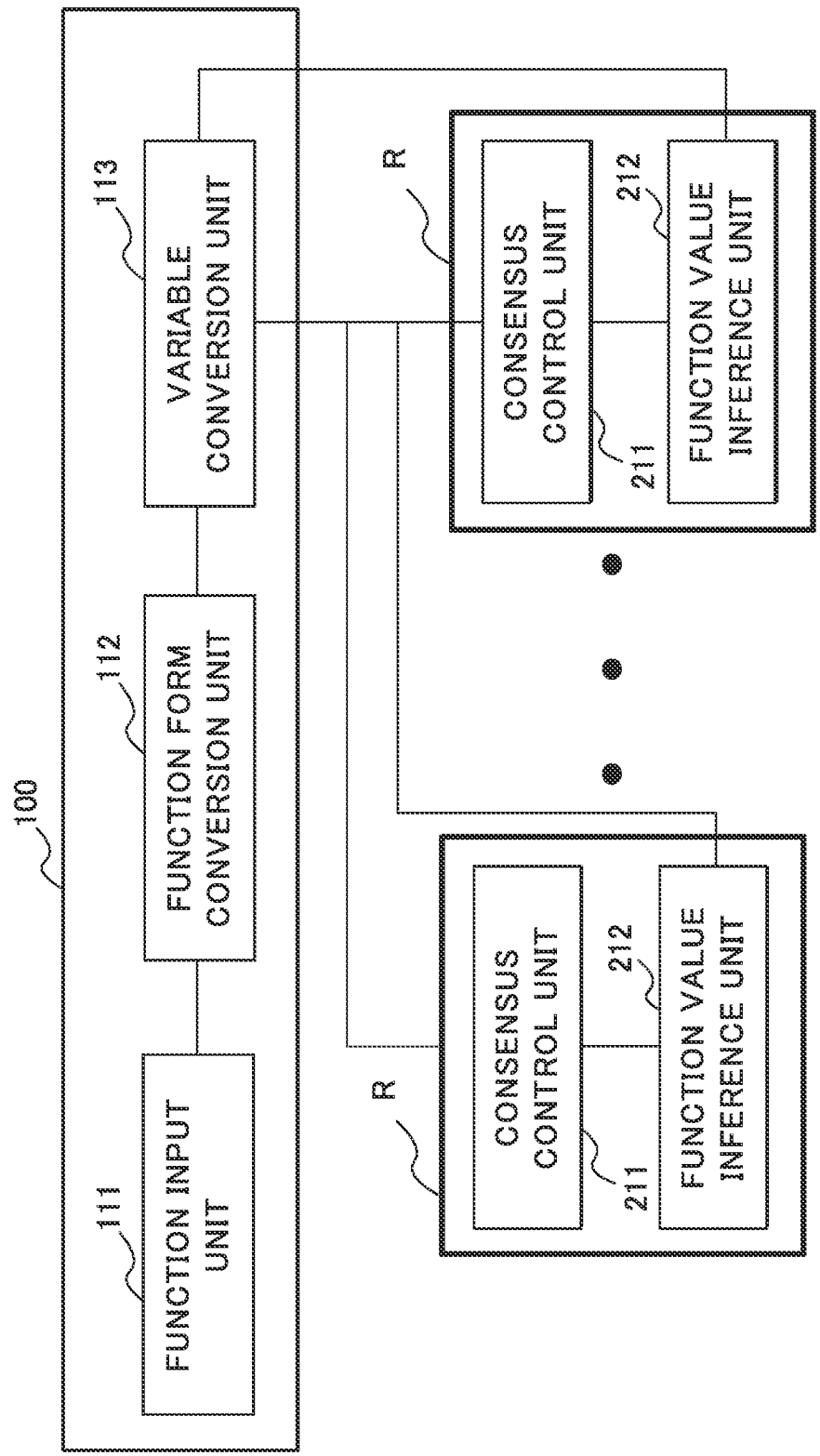

|  | SUITABILITY FOR TASK A | SUITABILITY FOR TASK B | SUITABILITY FOR TASK C |
|---|---|---|---|
| ROBOT $R_1$ TO $R_5$ | 2 | 3 | 0 |
| ROBOT $R_6$ TO $R_{10}$ | 2 | 1 | 1 |

FIG. 15
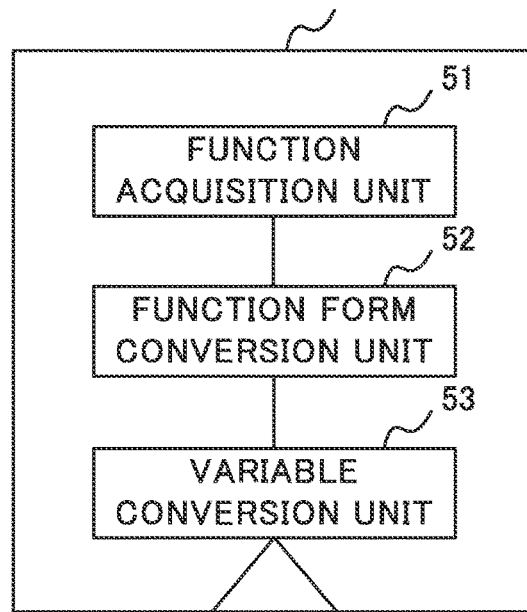
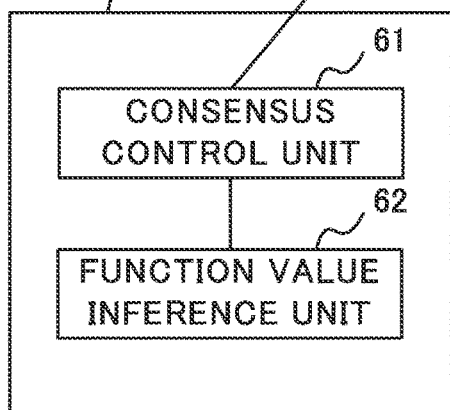
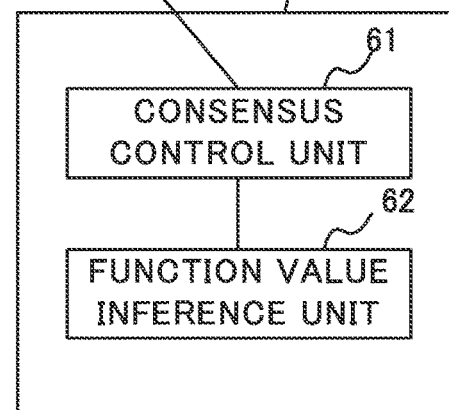

CONTROL SYSTEM, CONTROL APPARATUS, CONTROL METHOD, AND RECORDING MEDIUM

This application is a National Stage Entry of PCT/JP2020/007942 filed on Feb. 27, 2020, the contents of all of which are incorporated herein by reference, in their entirety.

TECHNICAL FIELD

The present disclosure relates to a technical field of a control system for performing a process of information observed by a robot.

BACKGROUND ART

A system in which a plurality of robots work together is called a multi-agent system. In the multi-agent system, the robots decide their own actions based on information sensed by their own sensors and local communications with other robots existing nearby. In a case where the action decision of each of the robots is made based on the sensed information of all of the robots, for example, it is necessary to propagate the sensed information such as a bucket relay by local communications among the robots, and to collect the sensed information of all of the robots. A method for collecting the sensed information is one found in a mobile sensor network or the like as described in Patent Document 1.

PRECEDING TECHNICAL REFERENCES

Patent Document

Patent Document 1: Japanese Laid-open Patent Publication No. 2006-338081

SUMMARY

Problem to be Solved by the Invention

In a case where action decision of each robot depends on observation information of all of the robots in a multi-agent system, it is necessary to propagate the observation information of all of the robots such as a bucket relay by local communications among the robots, and there is a problem that as the number of robots increases, a communication band is compressed, and a memory for storing sensed information increases.

It is one object of the present disclosure to provide a mechanism capable of efficiently collecting information necessary for the action decision of each robot based on the observation information of all of the robots, that is, with less communication band and memory.

Means for Solving the Problem

According to an example aspect of the present disclosure, there is provided a control system including: a control apparatus; and a plurality of robots,
wherein the control apparatus includes
a function acquisition means configured to acquire a function,
a function form conversion means configured to convert the function into a distributed calculable form, and
a variable conversion means configured to set, based on the function which form is converted, variables to be stored by each of the robots and a process corresponding to the variables, to the robot, and wherein each of the plurality of robots includes
a consensus control means configured to update variable values stored by the robot itself based on the set variables while sending and receiving variable values among other communicable robots, and
a function value inference means configured to infer a function value from the variables based on the set process.

According to another example aspect of the present disclosure, there is provided a control apparatus including:
a function acquisition means configured to acquire a function;
a function form conversion means configured to convert the function into a distributed calculable form; and
a variable conversion means configured to set, based on the function which form is converted, variables to be stored by each of a plurality of robots and a process corresponding to the variables, to the robot.

According to still another example aspect of the present disclosure, there is provided a control method, including:
acquiring a function;
converting the function into a distributed calculable form; and
setting, based on the function which form is converted, variables to be stored by each of a plurality of robots and a process corresponding to the variables, to the robot.

According to a further example aspect of the present disclosure, there is provided a recording medium storing a program, the program causing a computer to perform a process including:
acquiring a function;
converting the function into a distributed calculable form; and
setting, based on the function which form is converted, variables to be stored by each of a plurality of robots and a process corresponding to the variables, to the robot.

Effect of the Invention

According to the present disclosure, it becomes possible to collect information necessary for action decision of each robot based on observation information of all robots.

BRIEF DESCRIPTION OF THE DRAWINGS

FIG. 3 illustrates a functional configuration of a control system according to a first example embodiment.

FIG. 15 illustrates a functional configuration of a control system according to a fourth example embodiment.

EXAMPLE EMBODIMENTS

In the following, example embodiments will be described with reference to the accompanying drawings.

Overall Configuration

Figure 1:
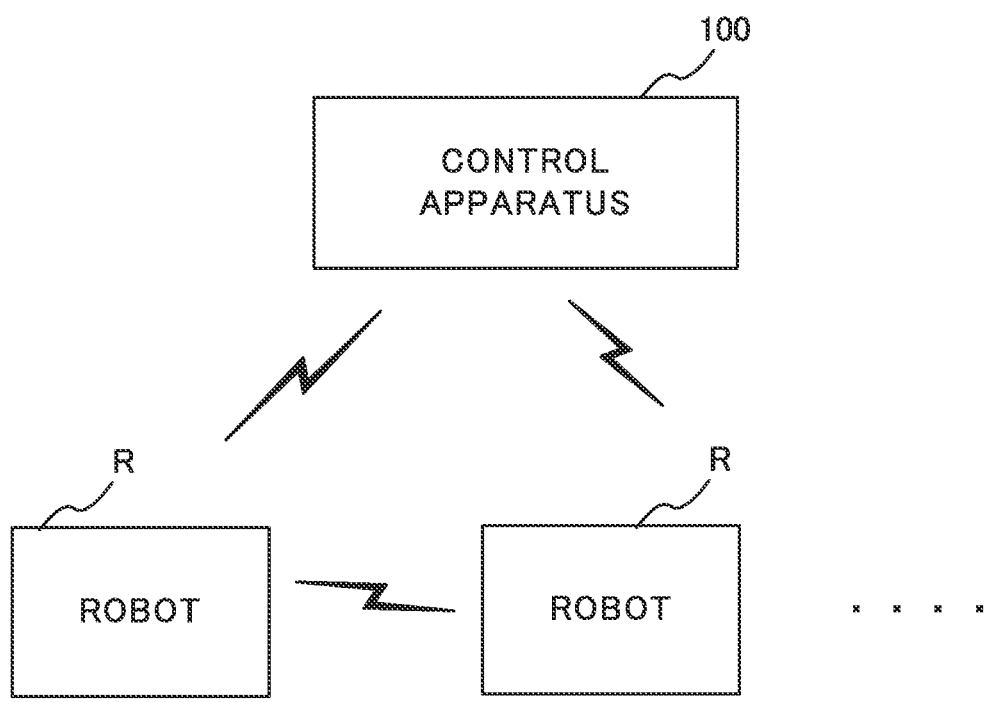
FIG. 1 illustrates an entire configuration of a robot control system according to example embodiments.

FIG. 1 illustrates an overall configuration of a robot control system (hereinafter, simply referred to as a "control system") according to example embodiments of the present disclosure. A control system 1 includes a control apparatus 100 and a plurality of robots R. The control apparatus 100 and the robots R can communicate with each other by wired or wireless means, and the robots R can also communicate with each other by wired or wireless means.

Hardware Configuration

Control Apparatus

Figure 2A:
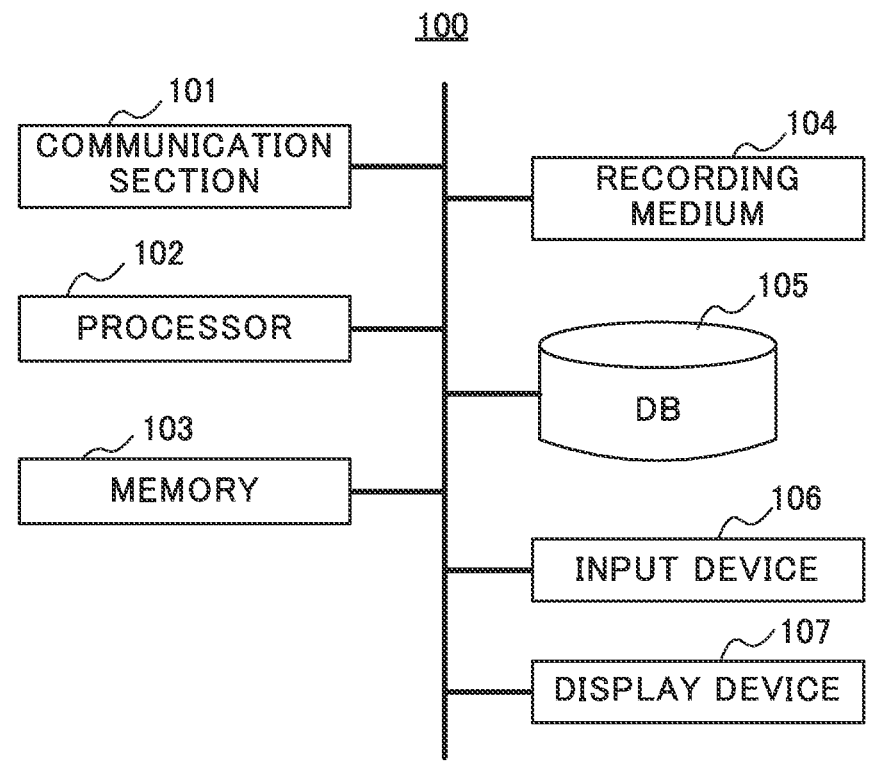
FIG. 2 illustrates hardware configurations of a control apparatus and a robot.

FIG. 2A illustrates a hardware configuration of the control apparatus 100. The control apparatus 100 includes a communication section 101, a processor 102, a memory 103, a recording medium 104, a database (DB) 105, an input device 106, and a display device 107.

The communication section 101 communicates with the robots R by wired or wireless means. The processor 102 is a computer such as a CPU (Central Processing Unit), a GPU (Graphics Processing Unit), or the like, and controls the entire control apparatus 100 by executing programs prepared in advance. In particular, the processor 102 performs a setting process of the robots to be described later.

The memory 103 is formed by a ROM (Read Only Memory), a RAM (Random Access Memory), or the like. The memory 103 stores various programs to be executed by the processor 102. The memory 103 is also used as a working memory during executions of various processes by the processor 102.

The recording medium 104 is a non-volatile and non-transitory recording medium such as a disk-shaped recording medium, a semiconductor memory, or the like, and is configured to be detachable from the control apparatus 100. The recording medium 104 records various programs executed by the processor 102.

The DB 105 stores functions and task information input by the user. In addition, the DB 105 stores information required for a conversion of a function form, conversion of variables, and the like which will be described later.

The input device 106 is, for instance, a keyboard, a mouse, a touch panel, or the like, and is used for a user to perform necessary instructions and inputs in connection with processes by the control apparatus 100. The display device 107 may be, for instance, a liquid crystal display, and displays a state of each of the robots, information concerning a control of each of the robots R, and the like.

Robot

Figure 2B:
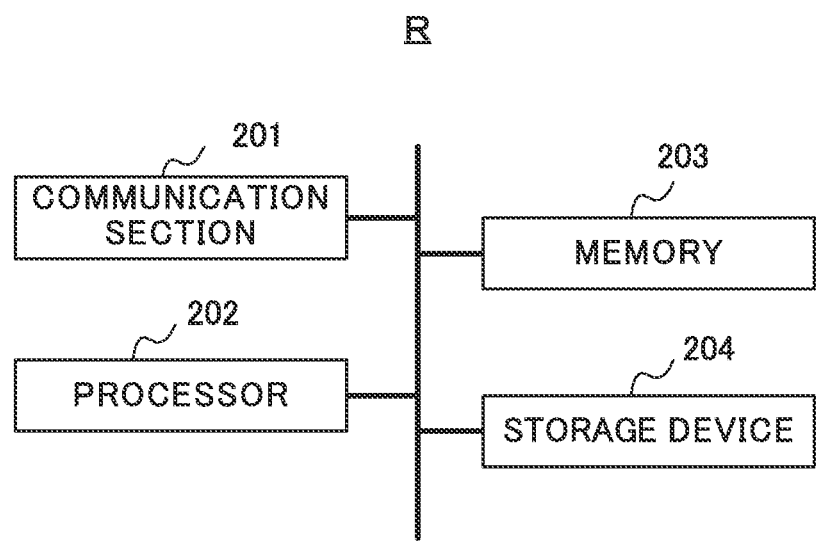

FIG. 2B illustrates a hardware configuration of each of the robots R. Each of the robots R includes a communication section 201, a processor 202, a memory 203, and a storage unit 204. The communication section 201 communicates with the control apparatus 100 and other robots R by wired or wireless means. The processor 202 is a computer such as a CPU and controls the robot R by executing programs prepared in advance. In particular, the processor 102 performs an operation process of the robot which will be described later.

The memory 203 is formed by a ROM, a RAM, and the like, and stores programs to be executed by the processor 202. The memory 203 is also used as a working memory during executions of various processes by the processor 202. The storage unit 204 stores various data related to an action performed by the robot in the storage unit 204 as needed.

First Example Embodiment

Next, a first example embodiment of the present disclosure will be described.
(Functional Configuration)

FIG. 3 illustrates a functional configuration of the control system 1 according to the first example embodiment. The control system 1 includes the control apparatus 100 and the plurality of the robots R. The control apparatus 100 mainly includes a function input unit 111, a function form conversion unit 112, and a variable conversion unit 113. Furthermore, each of the robots R includes a consensus control unit 211, a function value inference unit 212.

The function input unit 111 corresponds to a device for receiving an input of a function from the user. In this function, information that each robot R observes with a sensor and the like is regarded as an input value. Also, a function value becomes a reference of an action decision of each robot.

Now, $x_1, x_2, x_3, \ldots, x_n$ denote observation values representing information which robots $R_1, R_2, R_3, \ldots, R_n$ observe. At this time, a function input by the user is expressed by $F(x_1, x_2, x_3, \ldots, x_n)$. The observation values may be vector information. For instance, for location information from a GPS, the observation values are given as two-dimensional vectors.

A relationship between the input function and the action decision of the robot will be explained using a specific example. As an example, consider a multi-agent system that sounds an alert when an average temperature of an area exceeds 40° C. degrees. In this multi-agent system, robots as a group are scattered around the area, and sensors attached to respective robots detect temperature at that point. That is, in a case where the robot $R_1$ observes temperature of 41° C. degrees, $x_1=41$ is acquired. Since whether or not to sound the alert, which is regarded as the action decision of the robot, is decided based on the average temperature, the function to be input is expressed as $$F(x_1, x_2, x_3, \ldots, x_n) = \frac{1}{n}\sum_{i=1}^{n} x_i. \qquad \text{[Formula 1]}$$

The function form conversion unit 112 converts the function received by the function input unit 111 into a distributed calculable form. An example of a conversion is to convert a function into a graph structure formed by points and arrows. In this example, the function form conversion unit 112 converts the function received by the function input unit 111 into a graph in which a node corresponds to a function value (vector value), an edge corresponds to a function to which a node value of a root is input, and a merge of edges (tips of a plurality of arrows are collected in one node) corresponds to a sum calculation of function values which the edges output. In this graph, a calculation proceeds in a direction of the edge (arrow). Nodes (points) arranged at a beginning of the calculation correspond to the observation values of respective robots R. The edge (arrow) from the node corresponds to a function which input a value of the node. Moreover, the function described here may be a vector value function. Furthermore, in a case where a plurality of arrows merge at one node, a value corresponding to that node is regarded as a sum of values of incoming edges.

As a basic process, based on a dependent relationship between a certain node and a node at a root of each edge pointing to the certain node in a graph obtained by the conversion, the function form conversion unit 112 assigns all nodes to respective affiliations by repeating
  (i) a first process that assigns information of the plurality of robot and information of dependent nodes that respectively depend only on nodes belonging to the plurality of robots, to affiliations of respective robots, and
  (ii) a second process that copies a dependent node that multiply depends on the nodes belonging to the plurality of robots, by the number of dependencies, assigns each of copied dependent nodes to a corresponding robot, and thus deletes edges by only a node of the same affiliation from among the copied dependent nodes, sets nodes belonging to each robot as variables to the consensus control unit 211 of the robot, and stores information of the dependent relationship between the variables.

In the following, the conversion of the function form will be described using specific examples. Consider in a case where the input function is expressed as follows:

$$F(x_1, x_2, x_3, \ldots, x_n) = \frac{1}{n}\sum_{i=1}^{n}\left(x_i - \frac{1}{n}\sum_{i=1}^{n}x_i\right)^2. \quad \text{[Formula 2]}$$

This is a function to calculate a variance of the observation values for each robot R. For instance, in a case of desiring to reduce unevenness of temperature in a hot spring, this function can be used to calculate values of the variance corresponding to the unevenness of the temperature.

Figure 4:
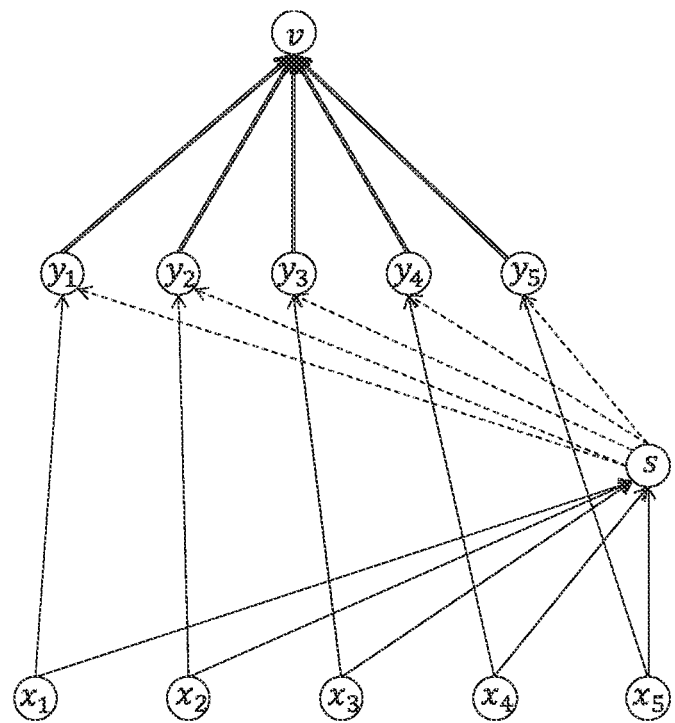
FIG. 4 illustrates an example of a function form conversion result.

For this function, in a case of five robots R now (robots $R_i=R_1$ through $R_5$), the function form conversion unit 112 converts a function being input into, for instance, a form in FIG. 4. In FIG. 4, each of edges indicated by solid lines corresponds to f(c)=c, and convey a value of a node at a base of that edge directly to a tip of an arrow. Each of edges illustrated by a dotted line corresponds to f(c)=−c/n, and a value of a node at a base of the edge is divided by n and changed to a negative value to be conveyed to the tip of the arrow. Each of edges indicated by a double line corresponds to $f(c)=c^2/n$. That is, a node s corresponds to a sum of the observation values of respective robots as follows:

$$\sum_{i=1}^{5} x_i, \quad \text{[Formula 3]}$$

and $y_i$ corresponds to the following formula 4:

$$x_i - \frac{1}{n}\sum_{i=1}^{5} x_i \quad \text{[Formula 4]}$$

Finally, a value corresponding to v is a function value.

As an example of a method for converting into a graph, there is a generative method based on the Kolmogorov-Arnold representation theorem. An example of this technique is detailed in Literature 1 below. However, in the present disclosure, the conversion is not the main focus and can be achieved by the existing method, and a description of the conversion method will be omitted. The following document 1 is incorporated herein by reference as part of this specification.

(Literature 1) Kiyotaka Yamamura, Yasuko Murayama, "An Algorithm for Representation of Non separable Functions in Separable Forms", technical research report of the Institute of Electronic Information and Communications Engineers. CAS, circuitry and system 93(102), 67-74, 1993-06-19.

The variable conversion unit 113 corresponds to a device for setting variables for a distributed calculation from a function which form is converted. In detail, the device sends information of a group of the variables, to which a consensus control is needed, to the consensus control unit 211 provided on each of the robots R.

An example of a variable conversion will be described using the conversion from a graph form in FIG. 4 to the variables. A purpose of the variable conversion is to determine which robot stores which variables and to determine dependent relationships among the variables. All nodes other than nodes corresponding to the observation values are converted to variables. The variable conversion starts at a node corresponding to the observation value, and then proceeds in order while following the arrows.

Figure 5:
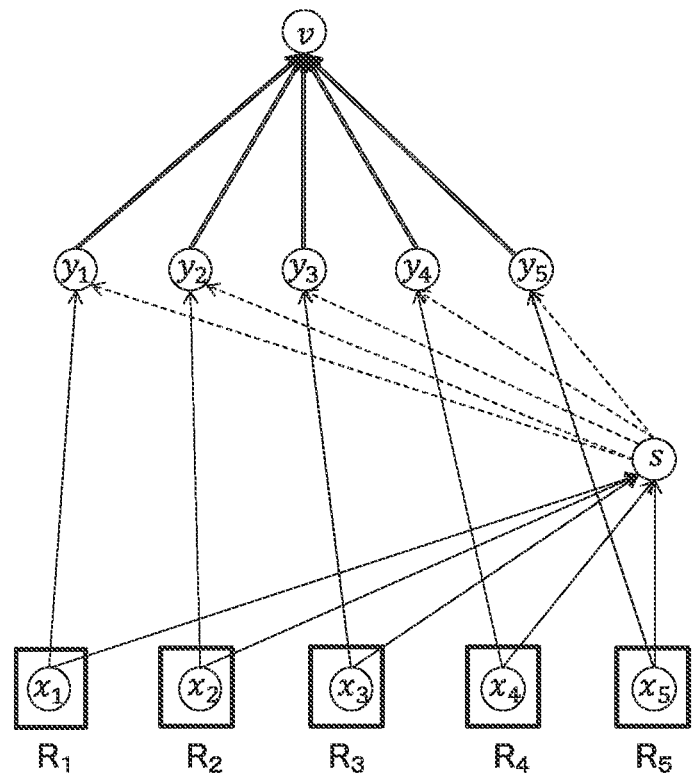
FIG. 5 illustrates an example of a variable conversion.
Figure 6:
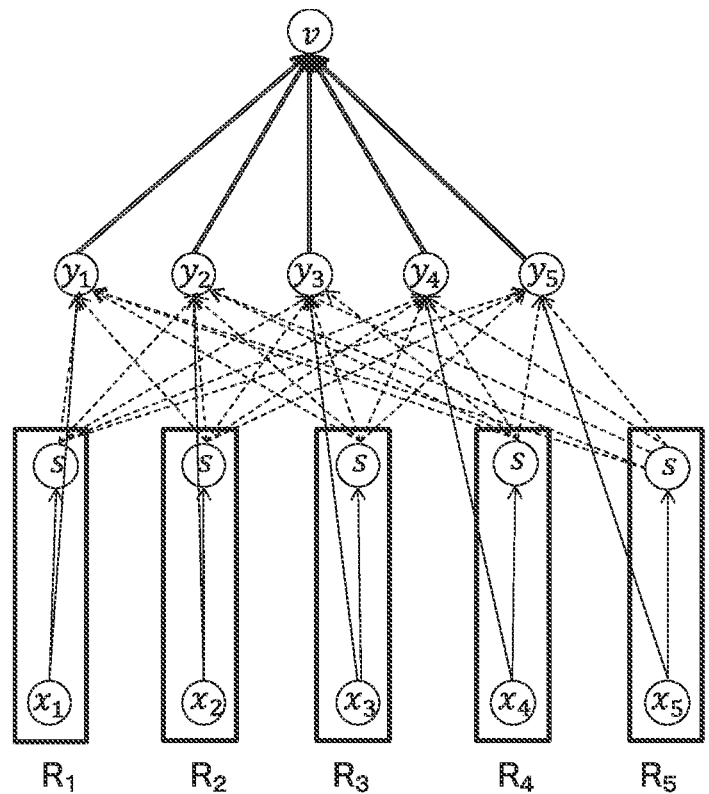
FIG. 6 illustrates an example of the variable conversion.
Figure 7:
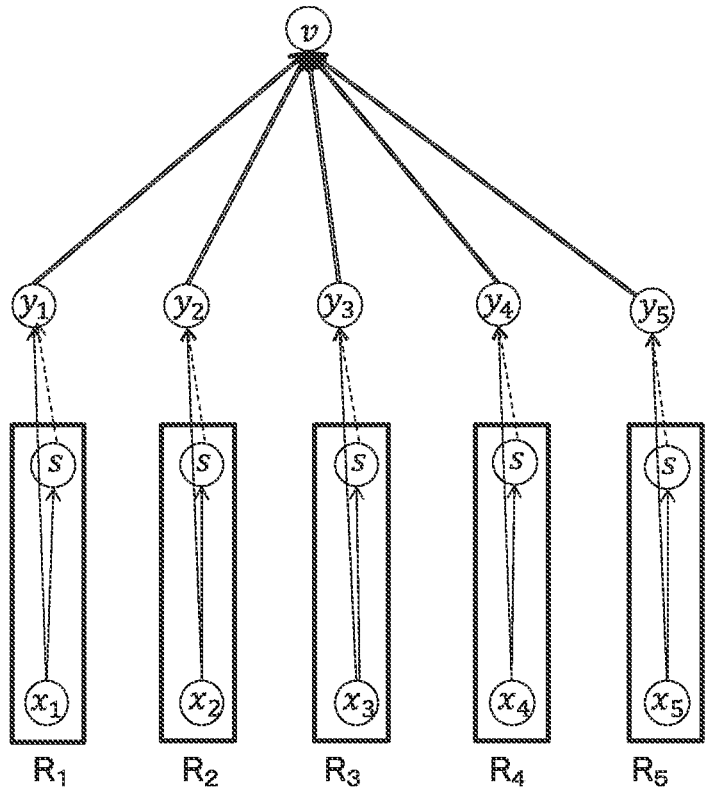
FIG. 7 illustrates an example of the variable conversion.
Figure 8:
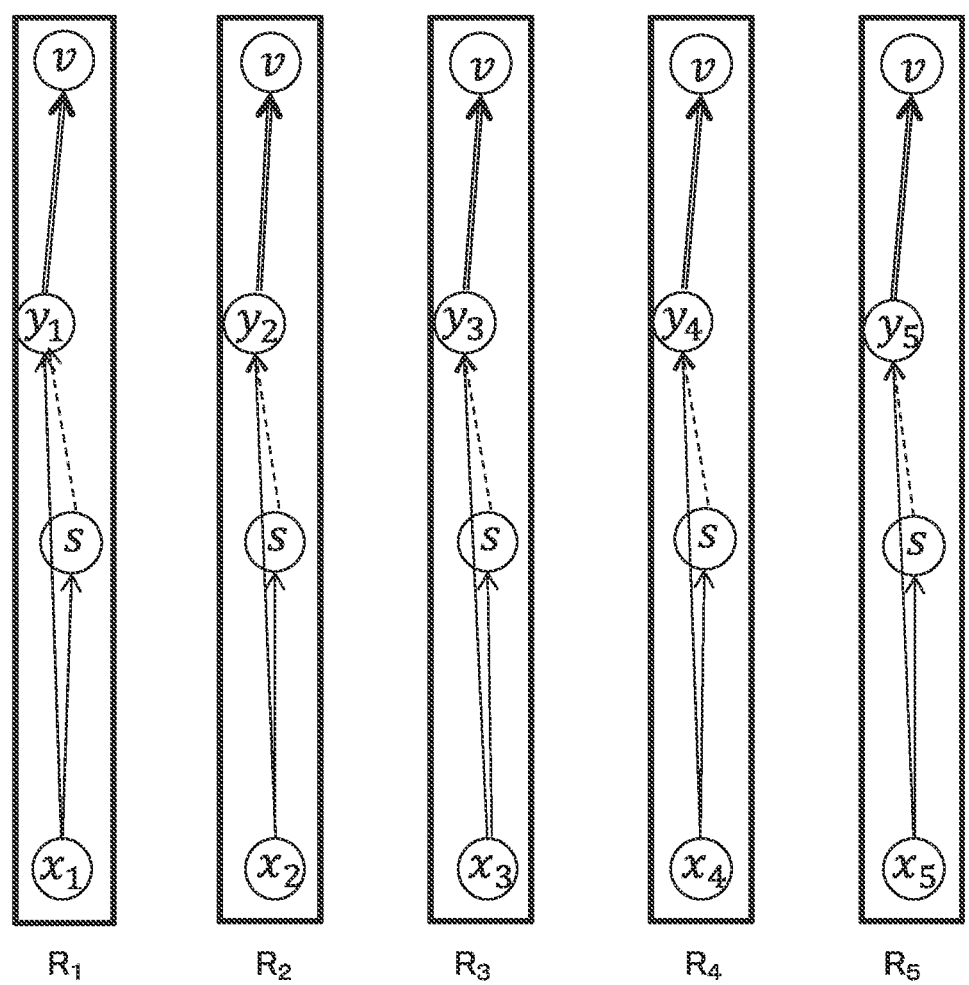
FIG. 8 illustrates an example of the variable conversion.

First, the variable conversion unit 113 clearly indicates to which robot the node corresponding to the observation value belongs. This result is illustrated in FIG. 5. Next, the variable conversion unit 113 copies a node, which is pointed by arrows from the nodes alone clearly indicated to belong to which robot, as many as the number of affiliations of nodes at respective bases of the arrows, and assigns the copied nodes respectively to the affiliations of the robots. This result is illustrated in FIG. 6. At a time of copying the node, each of the copied nodes points, by arrows, to nodes pointed by an original node, and each of the nodes at sides pointed to by the arrows connects only to each node belonging to the same affiliation as the node at the side, among multiple nodes pointing by arrows to the node at the side. The variable conversion unit 113 repeats this operation until the affiliation is specified for all of the nodes. However, each of the nodes pointed to by the arrows from a group of the copied nodes may select one edge from the copied nodes, and may delete other edges. This is called an edge selection. In addition, this edge selection can reduce a number of nodes to be copied, by selecting the edge so that the affiliation of a pointed node covers as much as possible. FIG. 7 illustrates a case where a node group of y performs the edge selection. FIG. 8 illustrates a final form after repeating this operation.

In FIG. 8, each of all nodes belong to one of the robots. The variable conversion unit 113 sets these nodes as variables for each affiliation. In the robot $R_2$, the variables s, $y_2$, and v are set for the consensus control unit 211 provided in the robot $R_2$. Each of the variables also records information of the node and the edge on which the variable depends, and records whether or not the variable itself is a unique variable among all of the robots. This information is used during the consensus control.

On each side of the robots R, the consensus control unit 211 calculates the variables based on the consensus control. As an example of the consensus control, there is a technique proposed in the following document 2. This technique is regarded as a technique for obtaining an average of observation values. In the present disclosure, the conversion of the function form and the variable conversion as pre-processes therein are added and used for inferring a function value. The following document 2 is incorporated herein by reference as a part of this specification.

(Literature 2) Demetri P. Spanos, Reza Olfati-Saber, Richard M. Murray. "Dynamic Consensus for Mobile Networks", 2005 IFAC World Congress.

In the multi-agent system considered in this example embodiment, not all the robots can communicate with all of the robots. For instance, consider a state where the robot $R_1$ and the robot $R_3$ can communicate with each other, but the robot $R_1$ and the robot $R_2$ cannot communicate with each other. However, it is assumed that the communication network is concatenated. Here, the concatenation means that all of the robots can be reached by tracing the communication network from a certain robot.

A set of robots with which the robots $R_i$ can communicate (directly) is denoted by $N_i$. An example of the consensus control is represented by the following formula illustrated in the above-mentioned document 2.

$$\dot{z}^i = \sum_{j \in N_i} (z^j - z^i) + \dot{w}^i \qquad \text{[Formula 5]}$$

$$z^i(0) = w^i(0)$$

Here, a superscripted number represents the affiliation, and w denotes a value calculated from the node and the edge on which the variable depends. In this example, $$w = n(f_1(c_1) + f_2(c_2) + \ldots) \qquad \text{[Formula 6]}$$

Where f denotes a function of the edge and c corresponds to a value of the node. Multiplying by n corresponds to merging of the edges in an original graph; however, in the consensus control, this operation corresponds to a calculation of the average value. In a case where a variable z does not belong to the robot Ri, $w^i=0$ is set. This operation will be described in detail with reference to FIG. 8. First, the consensus control of the variable s is expressed by the following formula.

$$\dot{s}^i = \sum_{j \in N_i} (s^j - s^i) + \dot{x}_i^j \qquad \text{[Formula 7]}$$

$$s^i(0) = 5x_i^j(0)$$

Here, $f_1$ corresponding to the edge illustrated by a solid line in FIG. 8 is $f_1$ (c)=c. The variable s initially starts at five times its own observation value, and approaches five times the average of the observation value, that is, a sum, by increasing or decreasing a difference in variables among the robots being communicable while reflecting a change of the observation value. Subsequently, the variable y is given by the following formula 8:

$$y_i^j(t) = x_i^j(t) - s^i(t)/5 \qquad \text{[Formula 8]}$$

This is not the consensus control, but corresponds to a special process with respect to the variables which are unique in all of the robots. In a case where the variables are unique for all of the robots, values are derived directly from dependent ones. Here, $f_1(c)=f(c)$ and $f_2(c)=-c/5$, and $f_2$ corresponds to a dotted line. Finally, the consensus control of the variable v is expressed by the following formula 9:

$$\dot{v}^i = \sum_{j \in N_i \cap R_z} (v^j - v^i) + 2 y_i^j \dot{y}_i^j \qquad \text{[Formula 9]}$$

$$v^i(0) = y_i^j(0)^2.$$

Here, a function corresponding to the double line is expressed by $f_3(c)=c^2/5$. In this example, a continuous time is used as the consensus control; alternatively, the consensus control of a discrete time may be applied.

The function value inference unit 212 estimates function values using the variable group as inputs. In a case of the above-described example of the consensus control, the function value inference unit 212 of each robot $R_i$ may use $v^i$ as it is as an inferred value of the function value. Other variables and observation values that belong to the robot $R_i$ may be used to infer the functional value. For instance, in a case of calculating a product of probabilities, that is, in a case where the following formula 10 is given:

$$F(x_1, x_2, x_3, \ldots, x_n) = \prod_{i=1}^{n} x_i, \qquad \text{[Formula 10]}$$

the function value is always less than the observation value. In other words, by using information of each of the observation values for an inference of an observation and giving a condition that the function value is less than or equal to the observation value, it is possible to improve accuracy of the inference.

With reference to FIG. 8, as an example, that the bandwidth and the number of memories required for a function value inference have been reduced will be described. In a case of calculating a dispersion of the observation values, the number of the variables required in the present example embodiment is three, the communication band may be prepared for two variables. Accordingly, this number does not depend on the number of the robots, and it is possible to reduce the required memory and communication band even in a case the number of the robots increases. On the other hand, in a case where the function value is calculated by propagating information to all of the robots in bucket relay form, each of the robots needs to communicate with other robots to send the information among all of the robots, and the more the number of the robots increase, the more the required memory and communication band increase.

(Process Flow)

Figure 9:
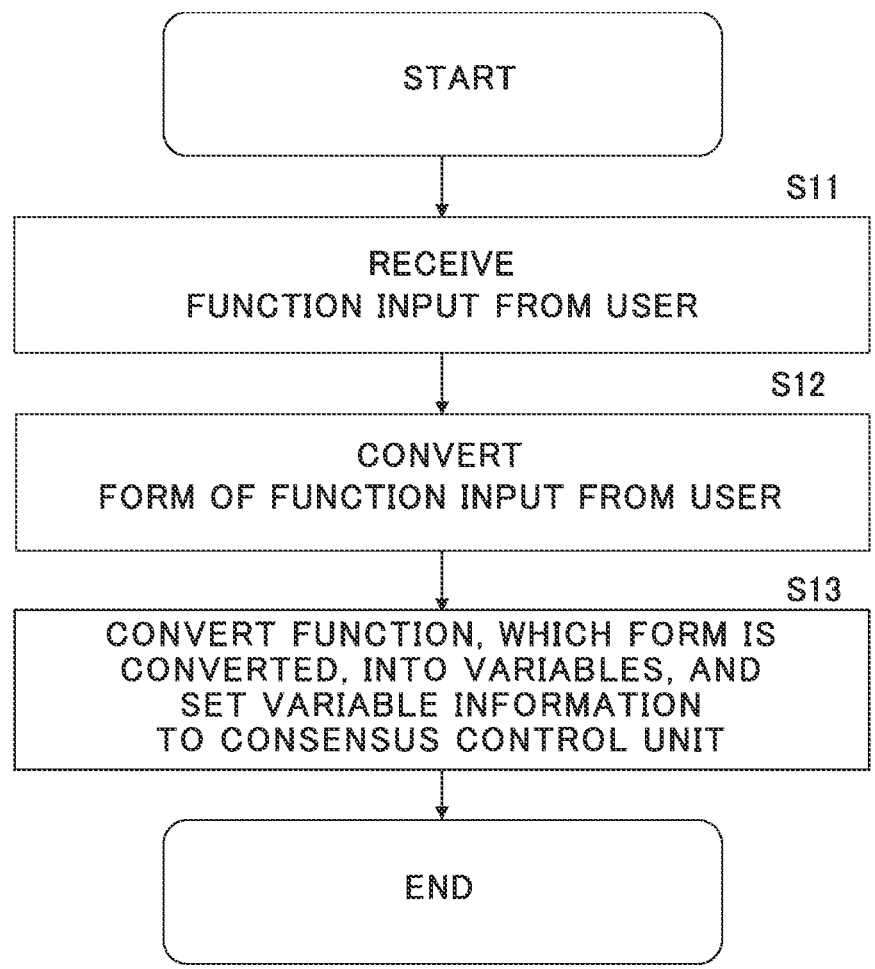
FIG. 9 is a flowchart of a setting process of a robot.

Next, the process flow will be described according to the present example embodiment. FIG. 9 is a flowchart of the setting process of a robot for performing a function value inference. The setting process is mainly performed by the control apparatus 100. First, the function input unit 111 receives a function as an action reference of the robots from a user (step S11). This is a part of settings of the robots by the user. Next, the function form conversion unit 112 converts the form of the function input by the user (step S12). Next, the variable conversion unit 113 converts a converted function into a form which is calculable by the robot group of the multi-agent system, and sets the robot, and performs the consensus control and the function value inference (step S13). Two processes by the function form conversion unit 112 and the variable conversion unit 113 are parts corresponding to the setting of the robots which is mechanically performed.

Figure 10:
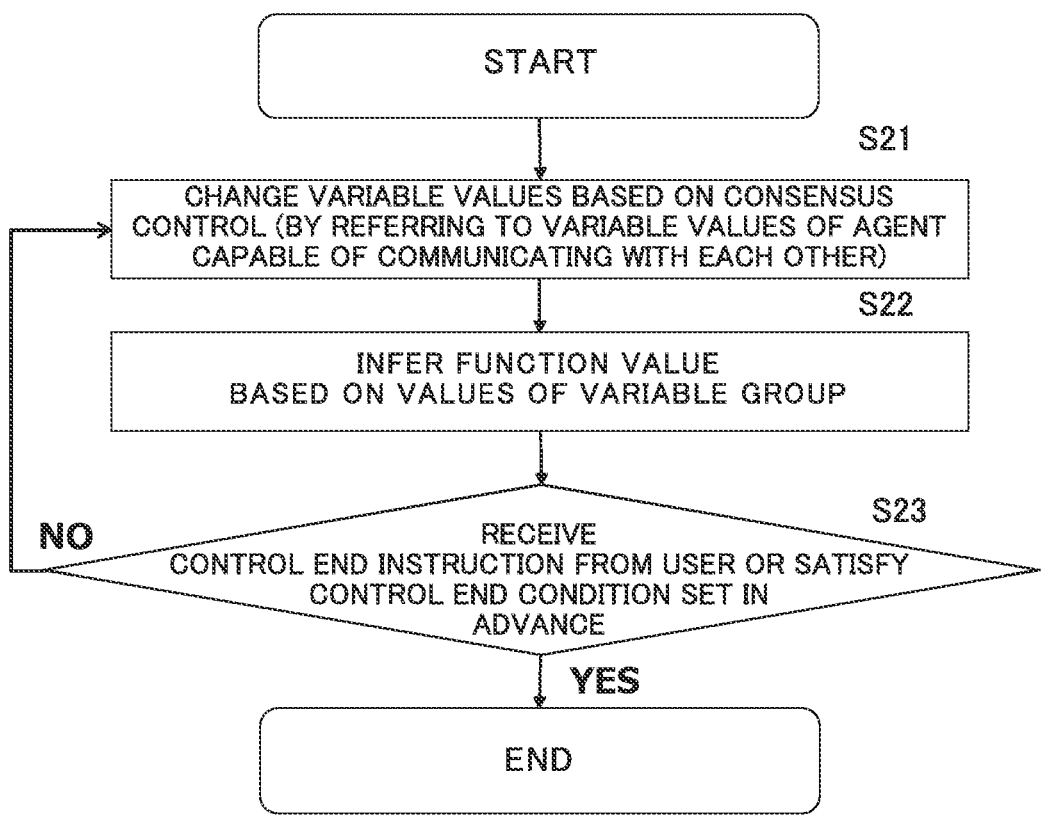
FIG. 10 is a flowchart of an operation process of the robot.

FIG. 10 is a flowchart of the operation process during an actual control of the robots. When the setting process of each robot R described above have been completed and the robot R is actually activated, the consensus control unit 211 and the function value inference unit 212 of each robot R start to perform calculations. First, the consensus control unit 211 updates the variable group (step S21), and then the function value inference unit 212 infers a function value based on the variable values (step S22). When these two processes are completed, in a case where the robot R does not satisfy the end condition, and steps S21 to S22 are repeated. That is, the consensus control unit 211 and the function value inference unit 212 always continue the calculation while the robot R is in operation, and repeats the update of the variable value and the function value to be inferred. Therefore, it is possible to continuously infer the function value while following a change of the actual function value even in a state where the observation value of the robot R keeps changing. The control ends when an instruction for terminating the control is given by an input of the user or when a predetermined end condition is satisfied (step S23: YES).

Second Example Embodiment

Figure 11:
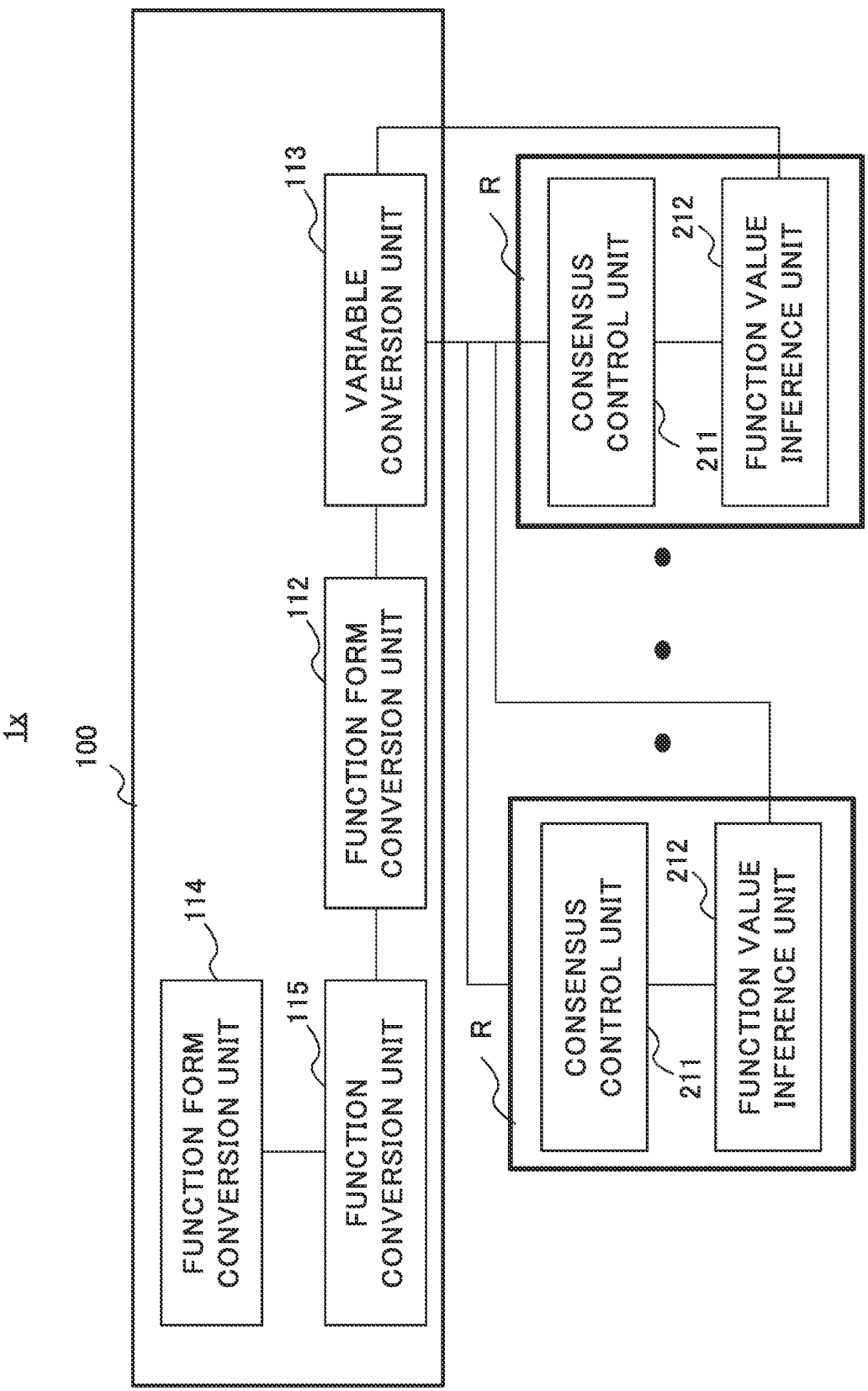
FIG. 11 illustrates a functional configuration of a control system according to a second example embodiment.

FIG. 11 illustrates a configuration of a control system 1x according to a second example embodiment. Different from a method for receiving an input from the user in the first example embodiment, in the present system, information input from the user is not a function but information related to a task. In detail, the control apparatus 100 includes a task information input unit 114 and a function conversion unit 115, instead of the function input unit 111 in the first example embodiment. By such a configuration, it is possible for the user to easily utilize the present disclosure as compared with designing and directly inputting the function that requires expert knowledge.

The task information input unit 114 receives information related to a task (hereinafter, referred to as "task information") from the user. The task information indicates, for instance, a final purpose of the task, constraints that the robot group complies with, suitability of each of the robots for the task, and the like. The constraints that the robot group complies with indicates, for instance, that the communication network of the robot group is not interrupted, and the suitability of each of the robots for the task indicates, for instance, a distance between a destination for a robot to be instructed to move and each of the robots.

The function conversion unit 115 converts the task information input by the user into a function. Although not illustrated in FIG. 11, an action setting unit or the like for setting the action decision based on the function value of each of the robots may also perform the action setting from the task information input by the user.

A process after the function conversion is the same as the first example embodiment. Processes up to the function conversion will be described with specific examples. The user assume that an ultimate objective is to distribute the robot group to a plurality of jobs. For instance, suppose that the number of robots is 10 and the number of jobs is 3, and it is desired to distribute three robots to a job A, five robots to a job B, and two robots to a job C.

Figures 12, 13:
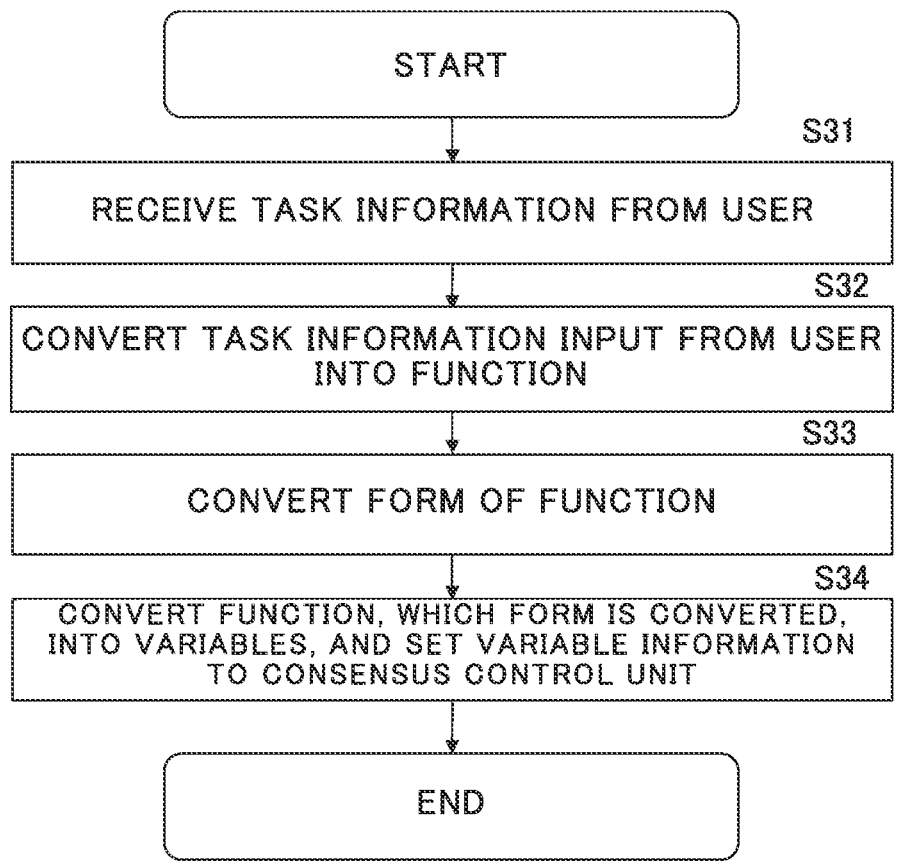
FIG. 12 illustrates an input example of task information of a user.
FIG. 13 is a flowchart of the setting process of the robot.

As the task information, the user first inputs information concerning these three types of jobs, and the number of robots to assign to respective jobs. Next, the user inputs a degree of the suitability of each of the robots for each of the jobs. For instance, in a case where one job corresponds to a job for carrying luggage, the suitability is determined based on the information on how much the robot can carry and how fast the robot is. Now, suppose that due to a problem of a supported weight, the robots $R_i=R_1$, $R_2$, $R_3$, $R_4$, $R_5$ are unable to perform the job C, but are able to move fast and suitable for work B. Conversely, the robots $R_i=R_6$, $R_7$, $R_8$, $R_9$, $R_{10}$ are able to perform the job C, but move slowly and are not suitable for the job B. In addition, the job A does not need to be fast, and may be carried out by either type of the robots. The suitability between each of the robots and each of the jobs in the case described above is, for instance, presented as illustrated in FIG. 12. FIG. 12 illustrates an example of the task information input by a user.

For instance, the function conversion unit 115 first converts the input task information into an optimization problem. Since many studies have illustrated relationships between various real problems and optimization problems, one of the conversion methods to the optimization problems is that the function conversion unit 115 includes a database of these associations. The previously described problem is an optimization problem related to a task assignment, and specifically is expressed by the following formula 11.

$$\max_{\alpha} \sum_{i=1}^{10} \sum_{j=1}^{3} \alpha_{ij} b_{ij} \qquad \text{[Formula 11]}$$

$$\text{s.t. } \alpha_{ij} \in \{0,1\}, \sum_{j=1}^{3} \alpha_{ij} \leq 1, \sum_{i=1}^{10} \alpha_{ij} = c_j$$

Here, $\alpha_{ij}$ is a variable indicating whether or not a robot i performs a task j, a task j is executed when $\alpha_{ij}=1$, and the task j is not executed when $\alpha_{ij}=0$. Moreover, $b_{ij}$ represents the degree of the suitability of the robot i for the task jj, and corresponds to the task information in FIG. 12 input by the user. Furthermore, $c_j$ is the number of the robots assigned to the task j. This optimization problem is to find a task assignment which makes each of the robots perform the most suitable job as much as possible, and the constraint written in a 's.t.' part represents that one robot only select to or not to carry out a task for each of tasks, that the number of the tasks which the robot can execute is one at most, and that $c_j$ robots are assigned to each of the tasks.

Next, this optimization problem is converted into a function. As an example of a conversion method from a constrained optimization problem into a simple unconstrained optimization problem, there is a method called a penalty method. This is a method for imposing a penalty such that an objective function degrades when the constraint is violated, and specifically is expressed as follows:

$$\max_{\alpha} \left( \sum_{i=1}^{10} \sum_{j=1}^{3} \alpha_{ij} b_{ij} - M \left( \sum_{i=1}^{10} \sum_{j=1}^{3} \alpha_{ij}(1-\alpha_{ij}) + \sum_{i=1}^{10} \max\left\{0, \sum_{j=1}^{3} \alpha_{ij} - 1\right\}^2 + \sum_{j=1}^{3} \left( \sum_{i=1}^{10} \alpha_{ij} - c_j \right)^2 \right) \right) \qquad \text{[Formula 12]}$$

M>0 is a constant representing a weight of the penalty, and the larger this value is, the less likely the constraint is to be violated. In this formula, a constraint portion is deformed and is in M or less brackets.

Finally, considering that a maximization problem is solved based on a gradient method, a function corresponding to a gradient is derived, and this function is used as a converted function. A partial differential based on the $\alpha_{ij}$ is expressed by the following formula 13.

$$b_{ij} = M\left(1 - 2\alpha_{ij} + 2\alpha_{ij}\max\left\{0, \sum_{j=1}^{3}\alpha_{ij} - 1\right\} + 2\alpha_{ij}\sum_{i=1}^{10}(\alpha_{ij} - c_j)\right)$$ [Formula 13]

In this task, this function corresponds to the converted function. Each of the robots can decide which task to perform by the robot itself by updating the variable $\alpha_{ij}$ based on this function. Moreover, for instance, each of the robots naturally reaches a task start location when the task assignment is determined, by keeping moving a location of the robot to a destination which is represented by a weighted average '$\alpha_{i1}x_A + \alpha_{i2}x_B + \alpha_{i3}x_C$' of points $x_A$, $x_B$, $x_C$ at which tasks A, B, and C are performed.

(Process Flow)

Next, a process flow will be described according to the second example embodiment. FIG. 13 is a flowchart of a setting process of each of the robots in the second example embodiment. This process is mainly performed by the control apparatus 100. First, the task information input unit 114 receives the task information from the user (step S31). After that, the function conversion unit 115 converts information related to the input task into a function (step S32). The subsequent procedure is the same as that in the first example embodiment. That is, the function form conversion unit 112 converts a form of the function obtained in step S32 (step S33). Then, the variable conversion unit 113 converts the information into which the function is converted, into a variable, and conducts settings to the robot in order to perform the consensus control and the function value inference (step S34).

Third Example Embodiment

Figure 14:
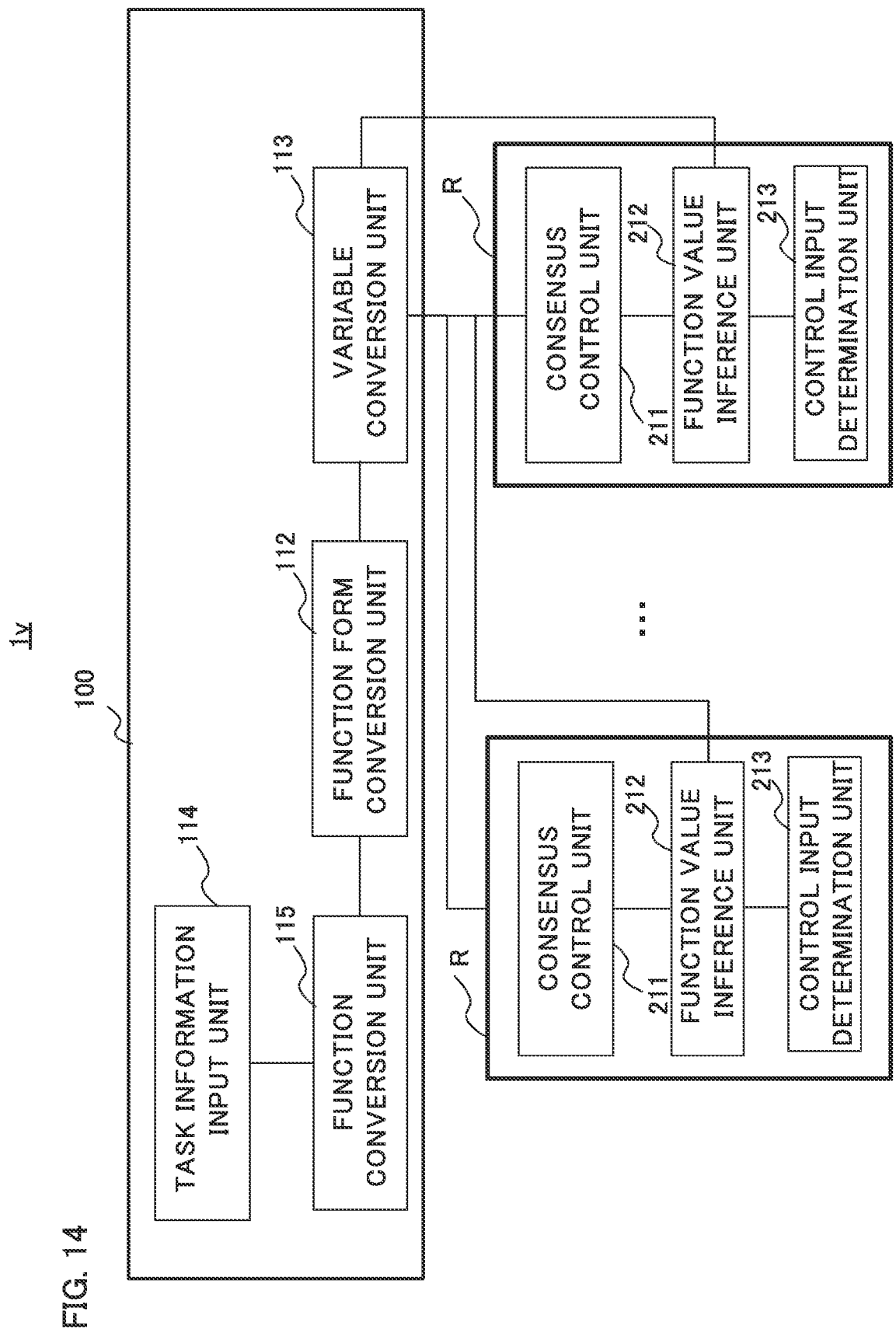
FIG. 14 illustrates a functional configuration of a control system according to a third example embodiment.

In a third example embodiment, a configuration of an artificial force field control and a control barrier function using a function inference value, which are specific applications in the second example embodiment, will be described. A functional configuration of a control system 1y in the third example embodiment is illustrated in FIG. 14. In the third example embodiment, each of the robots R includes a control input determination unit 213 in addition to the consensus control unit 211 and the function value inference unit 212.

Both the artificial force field control and the control barrier function first design a function corresponding to a task, and determine a control input using a gradient and a function value of the function. For instance, in the artificial force field control, a function P is designed in which a state of each of the robots R is taken as a parameter according to the task. After that, based on the partial differential of each of the robots R, it determines the control input of the robot R. An example of a typical control input is expressed by the following formula 14:

$$u_i = -\frac{\partial P}{\partial x_i}(x).$$ [Formula 14]

Here, $u_i$ denotes the control input, x denotes a state of a robot $R_i$, and x denotes each state for all of the robots. On the other hand, as one example of the control barrier function, the function B is designed and is defined so that the control input satisfies the following formula.

$$\frac{\partial B}{\partial x_i}(x)^T u_i \geq -B(x)$$ [Formula 15]

By calculating these functions P and B and gradients of P and B based on the function inference illustrated in the first example embodiment, it is possible to control respective robots R in a distributed manner. For instance, suppose that functions P and B can be rewritten into functions in the following form:

$$\sum_{k=1}^{m}\Phi_k(\sum_{i}\phi_{ik}(x_i))$$ [Formula 16]

This refers to an example of a function form conversion which is different from the specific examples of the function conversion in the first example embodiment. From this function, the variable conversion and the consensus control are expressed as follows:

$$\dot{s}_k^i = \sum_{j \in N_i}(s_k^j - s_k^i) + \dot{\phi}_{ik}(x_i)$$ [Formula 17]

The functions P and B and their gradients are inferred in the robot $R_i$, respectively, as follows:

$$\sum_{k=1}^{m}\Phi_k(ns_k^i)$$ [Formula 18]

$$\sum_{k=1}^{m}\Delta\Phi_k(ns_k^i)\frac{\partial \phi_{ik}}{\partial x_i}(x_i).$$ [Formula 19]

Here, $\Delta\Phi_k$ denotes a gradient of $\Phi_k$. In a case of the artificial force field control, for instance, the control input determination unit 213 determines a control input based on a function value which is inferred such the following formula 20:

$$u_i = -\sum_{k=1}^{m}\Delta\Phi_k(ns_k^i)\frac{\partial \phi_{ik}}{\partial x_i}(x_i)$$ [Formula 20]

And in the control barrier function, $$\left(\sum_{k=1}^{m}\Delta\Phi_k(ns_k^i)\frac{\partial \phi_{ik}}{\partial x_i}(x_i)\right)^T u_i \geq -\sum_{k=1}^{m}\Phi_k(ns_k^i)$$ [Formula 21]

the above formula 21 gives a constraint to the control input based on an inferred value of the function and an inferred value of the gradient.

Fourth Example Embodiment

FIG. 15 illustrates a configuration of a control system according to a fourth example embodiment. The control system includes a control apparatus 50 and a plurality of robots 60. The control apparatus 50 includes a function acquisition unit 51, a function form conversion unit 52, and a variable conversion unit 53. The function acquisition unit 51 acquires the function. The function form conversion unit 52 converts a function into a distributed calculable form. The variable conversion unit 53 sets, based on the function which form is converted, variables to be stored by individual robots and processes corresponding to the variables, to respective robots.

Each of the robot 60 includes a consensus control unit 61, and a function value inference unit 62. The consensus control unit 61 updates a variable value stored by itself based on the set variable while sending and receiving variable values with other communicable robots. The function value inference unit 62 infers the function value from the variable based on the set process.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

1 Control system
100 Control apparatus
111 Function input unit
112 Function form conversion unit
113 Variable conversion unit
114 Task information input unit
115 Function variable unit
211 Consensus control unit
212 Function value inference unit
213 Control input determination unit
R Robot

What is claimed is:

1. A control system comprising a control apparatus and a plurality of robots,
wherein the control apparatus includes:
a first memory storing first instructions; and
one or more first processors configured to execute the first instructions to:
acquire an input function to which observation values output by sensors provided in the robots are input;
perform a function form conversion which converts the input function into a distributed calculable form which is calculable by the plurality of robots in a distributed manner; and
based on the converted function form, perform a variable conversion of setting variables to be stored by each of the robots and a variable process for the variables to be performed by each of the plurality of robots,
wherein the function form conversion comprises:
converting the function into a source graph including a plurality of nodes and a plurality of edges, where:
each node has a value,
each edge points from a first node to a second node and corresponds to a function which receives as input the value of the first node and provides as output a function value to the second node,
the nodes include a plurality of root nodes and a plurality of sum nodes, the root nodes respectively corresponding to the plurality of robots,
the value of each root node being the observation value output by the sensor provided in the robot to which the root node corresponds,
the value of each sum node being a sum of the function value of each edge pointing to the sum node,
generating a plurality of target graphs for the plurality of robots from the source graph, where each target graph has a plurality of nodes and a plurality of edges that are assigned to only one robot of the plurality of robots, by:
for each robot, assigning, as belonging to the robot, the root node corresponding to the robot and each sum node to which only the root node corresponding to the robot points;
for each sum node not assigned to any robot, copying the sum node a number of times so that there is a copy of the sum node for each node pointing to the sum node;
for each copy of each sum node, deleting the edges pointing to the sum node so that the copy of the sum node depends only on the root node corresponding to one of the robots; and
assigning each copy of each sum node as belonging to the robot having the root node to which the copy of the sum node depends,
wherein the variable conversion comprises:
setting each copy of each sum node to a variable subjected to a consensus control in the robot to which the copy of the sum node belongs; and
for each copy of each sum node, associating the function of the edge from the copy of the sum node with a function of dividing by a number of the robots, and
wherein each of the plurality of robots includes:
a second memory storing second instructions; and
one or more second processors configured to execute the second instructions to:
update the variables stored by the robot as the sensor of the robot outputs the observation value thereof, and while the robot sends and receives variable values with other of the robots, and
infer a value of the input function based on the variable process.

2. The control system according to claim 1, wherein the first processors are configured to execute the first instructions to further acquire the input function that is an action reference of each of the robots, from a user.

3. The control system according to claim 1, wherein the first processors are configured to execute the first instructions to further:
receive input of task information concerning a task from a user; and
convert the input task information into the input function.

4. A control apparatus that controls a plurality of robots, comprising:
   a first memory storing first instructions; and
   one or more first processors configured to execute the first instructions to:
      acquire an input function to which observation values output by sensors provided in the robots are input;
      perform a function form conversion which converts the input function into a distributed calculable form which is calculable by the plurality of robots in a distributed manner; and
      based on the converted function form, perform a variable conversion of setting variables to be stored by each of the robots and a variable process for the variables to be performed by each of the plurality of robots,
   wherein the function form conversion comprises:
      converting the function into a source graph including a plurality of nodes and a plurality of edges, where:
         each node has a value,
         each edge points from a first node to a second node and corresponds to a function which receives as input the value of the first node and provides as output a function value to the second node,
         the nodes include a plurality of root nodes and a plurality of sum nodes, the root nodes respectively corresponding to the plurality of robots,
         the value of each root node being the observation value output by the sensor provided in the robot to which the root node corresponds,
         the value of each sum node being a sum of the function value of each edge pointing to the sum node,
      generating a plurality of target graphs for the plurality of robots from the source graph, where each target graph has a plurality of nodes and a plurality of edges that are assigned to only one robot of the plurality of robots, by:
         for each robot, assigning, as belonging to the robot, the root node corresponding to the robot and each sum node to which only the root node corresponding to the robot points;
         for each sum node not assigned to any robot, copying the sum node a number of times so that there is a copy of the sum node for each node pointing to the sum node;
         for each copy of each sum node, deleting the edges pointing to the sum node so that the copy of the sum node depends only on the root node corresponding to one of the robots; and
         assigning each copy of each sum node as belonging to the robot having the root node to which the copy of the sum node depends,
   wherein the variable conversion comprises:
      setting each copy of each sum node to a variable subjected to a consensus control in the robot to which the copy of the sum node belongs; and
      for each copy of each sum node, associating the function of the edge from the copy of the sum node with a function of dividing by a number of the robots, and
   wherein each of the plurality of robots includes:
      a second memory storing second instructions; and
      one or more second processors configured to execute the second instructions to:
         update the variables stored by the robot as the sensor of the robot outputs the observation value thereof, and while the robot sends and receives variable values with other of the robots, and
         infer a value of the input function based on the variable process.

5. A control method performed by a control apparatus and that controls a plurality of robots, comprising:
   acquiring an input function to which observation values output by sensors provided in the robots are input;
   performing a function form conversion which converts the input function into a distributed calculable form which is calculable by the plurality of robots in a distributed manner; and
   based on the converted function form, performing a variable conversion of setting variables to be stored by each of the robots and a variable process for the variables to be performed by each of the plurality of robots,
   wherein the function form conversion comprises:
      converting the function into a source graph including a plurality of nodes and a plurality of edges, where:
         each node has a value,
         each edge points from a first node to a second node and corresponds to a function which receives as input the value of the first node and provides as output a function value to the second node,
         the nodes include a plurality of root nodes and a plurality of sum nodes, the root nodes respectively corresponding to the plurality of robots,
         the value of each root node being the observation value output by the sensor provided in the robot to which the root node corresponds,
         the value of each sum node being a sum of the function value of each edge pointing to the sum node,
      generating a plurality of target graphs for the plurality of robots from the source graph, where each target graph has a plurality of nodes and a plurality of edges that are assigned to only one robot of the plurality of robots, by:
         for each robot, assigning, as belonging to the robot, the root node corresponding to the robot and each sum node to which only the root node corresponding to the robot points;
         for each sum node not assigned to any robot, copying the sum node a number of times so that there is a copy of the sum node for each node pointing to the sum node;
         for each copy of each sum node, deleting the edges pointing to the sum node so that the copy of the sum node depends only on the root node corresponding to one of the robots; and
         assigning each copy of each sum node as belonging to the robot having the root node to which the copy of the sum node depends,
   wherein the variable conversion comprises:
      setting each copy of each sum node to a variable subjected to a consensus control in the robot to which the copy of the sum node belongs; and
      for each copy of each sum node, associating the function of the edge from the copy of the sum node with a function of dividing by a number of the robots, and
   wherein each of the plurality of robots includes:
      a memory storing instructions; and
      one or more processors configured to execute the instructions to:
         update the variables stored by the robot as the sensor of the robot outputs the observation value thereof, and while the robot sends and receives variable values with other of the robots, and infer a value of the input function based on the variable process.

6. A non-transitory computer-readable recording medium storing a program causing a computer to perform processing comprising:

acquiring an input function to which observation values output by sensors provided in the robots are input;

performing a function form conversion which converts the input function into a distributed calculable form which is calculable by the plurality of robots in a distributed manner; and based on the converted function form, performing a variable conversion of setting variables to be stored by each of the robots and a variable process for the variables to be performed by each of the plurality of robots, wherein the function form conversion comprises:

converting the function into a source graph including a plurality of nodes and a plurality of edges, where:

each node has a value, each edge points from a first node to a second node and corresponds to a function which receives as input the value of the first node and provides as output a function value to the second node, the nodes include a plurality of root nodes and a plurality of sum nodes, the root nodes respectively corresponding to the plurality of robots, the value of each root node being the observation value output by the sensor provided in the robot to which the root node corresponds, the value of each sum node being a sum of the function value of each edge pointing to the sum node, generating a plurality of target graphs for the plurality of robots from the source graph, where each target graph has a plurality of nodes and a plurality of edges that are assigned to only one robot of the plurality of robots, by:

for each robot, assigning, as belonging to the robot, the root node corresponding to the robot and each sum node to which only the root node corresponding to the robot points;

for each sum node not assigned to any robot, copying the sum node a number of times so that there is a copy of the sum node for each node pointing to the sum node;

for each copy of each sum node, deleting the edges pointing to the sum node so that the copy of the sum node depends only on the root node corresponding to one of the robots; and assigning each copy of each sum node as belonging to the robot having the root node to which the copy of the sum node depends, wherein the variable conversion comprises:

setting each copy of each sum node to a variable subjected to a consensus control in the robot to which the copy of the sum node belongs; and for each copy of each sum node, associating the function of the edge from the copy of the sum node with a function of dividing by a number of the robots, and wherein each of the plurality of robots includes:

a memory storing instructions; and one or more processors configured to execute the instructions to:

update the variables stored by the robot as the sensor of the robot outputs the observation value thereof, and while the robot sends and receives variable values with other of the robots, and infer a value of the input function based on the variable process.

\* \* \* \* \*